United States Patent
Tanimukai et al.

(10) Patent No.: US 7,233,559 B2
(45) Date of Patent: Jun. 19, 2007

(54) OPTICAL DISC DRIVE AND METHOD OF UPDATING FIRMWARE

(75) Inventors: Hiromichi Tanimukai, Osaka (JP); Teruhiko Ohzuchi, Kanagawa (JP)

(73) Assignee: Mitsumi Electric Co. Ltd. (JP)

( * ) Notice: Subject to any disclaimer, the term of this patent is extended or adjusted under 35 U.S.C. 154(b) by 659 days.

(21) Appl. No.: 10/675,335

(22) Filed: Sep. 29, 2003

(65) Prior Publication Data

US 2004/0062166 A1    Apr. 1, 2004

(30) Foreign Application Priority Data

Sep. 30, 2002  (JP) .............................. 2002-287912

(51) Int. Cl.
*G11B 7/00* (2006.01)
(52) U.S. Cl. ................. 369/53.37; 369/53.21
(58) Field of Classification Search ............. 369/53.21, 369/53.37
See application file for complete search history.

(56) References Cited

U.S. PATENT DOCUMENTS

| | | | |
|---|---|---|---|
| 6,170,043 B1 | 1/2001 | Hu | |
| 6,253,281 B1 | 6/2001 | Hall | |
| 6,370,444 B1 * | 4/2002 | Kusunoki | ................... 700/214 |
| 2001/0044933 A1 | 11/2001 | Tagiri et al. | |
| 2001/0048659 A1 | 12/2001 | Weirauch et al. | |

FOREIGN PATENT DOCUMENTS

| | | |
|---|---|---|
| EP | 0851418 A2 | 7/1998 |
| EP | 1235216 | 8/2002 |
| JP | 05-081012 | 4/1993 |
| JP | 2000-003276 | 1/2000 |
| JP | 2000-242503 | * 9/2000 |
| JP | 2002-032237 | * 1/2002 |

OTHER PUBLICATIONS

English language abstract of Japanese Publication No. 2000-003276.

(Continued)

*Primary Examiner*—Wayne Young
*Assistant Examiner*—Van T. Pham
(74) *Attorney, Agent, or Firm*—Marger Johnson & McCollom, P.C.

(57) ABSTRACT

An optical disc drive 1 of the present invention includes an electrically rewritable flash ROM 32 which stores firmware of the optical disc drive 1; means for judging whether or not the loaded optical disc 2 is a predetermined type of optical disc in which update data for updating the currently stored firmware is stored when the optical disc 2 is loaded into the optical disc drive 1; a buffer memory 31 for temporarily storing the update data recorded in the loaded optical disc 2 in the case where the judging means judges that the loaded optical disc 2 is the predetermined type of optical disc; and control means 9 for determining whether the currently stored firmware of the optical disc drive 1 should be updated with the update data based on the absence or presence of a predetermined signal (a signal outputted when an eject button is pushed), and updating the currently stored firmware with the update data stored in the buffer memory 31 in the case where it is determined that the currently stored firmware of the optical disc should be updated.

12 Claims, 4 Drawing Sheets

OTHER PUBLICATIONS

English language abstract of Japanese Publication No. 05-081012.
English language abstract of Japanese Publication No. 11003219.
English language abstract of Japanese Publication No. 11353127.
English language abstract of Japanese Publication No. 2000207193.
English language abstract of Japanese Publication No. 2000242598.

* cited by examiner

OPTICAL DISC DRIVE AND METHOD OF UPDATING FIRMWARE

FIELD OF THE INVENTION

The present invention is related to an optical disc drive that carries out recording and/or reproducing data onto and/or from an optical disc, and to a method of updating firmware of the optical disc drive.

DESCRIPTION OF THE PRIOR ART

In recent years, since optical discs are inexpensive, an optical disc drives that reproduce and/or record data from and/or onto an optical disc such as a CD-R, a CD-RW or the like are spread rapidly. Each of these optical disc drives includes an electrically rewritable flash ROM in which firmware of microcomputer (control means) of the optical disc drive is stored for controlling overall of the system.

The optical disc drive such as a CD-R, CD-RW or the like and the optical disc drive for recording and/or reproducing data onto and/or from such optical discs become multifunctional and sophisticated rapidly (for example, increasing capacity of a disc for recording (time for recording) or speeding up a recording speed (that is, writing data transfer rate)). Firmware for the optical disc drive has been improved with such developments. In the optical disc drives that has been manufactured and sold in past days, in order to deal with such improved functions it is necessary to update the firmware pre-stored (currently stored) in the optical disc drives.

In one conventional method of updating the firmware of an optical disc drive, the firmware is updated using commands and data transferred from utilities stored in a hard disk of a host computer (host PC) that is connected to the optical disc drive. Further, in another conventional method of updating the firmware, the firmware is updated by operating by remote control from other PC or a server connected to the optical disc drive via a network such as a LAN or an Internet, or by downloading predetermined commands and data. In this regard, Laid-Open Japanese Patent Publication No. 2000-3276 discloses a firmware updating method using floppy® disk drive, and Laid-Open Japanese Patent Publication No. Hei. 5-81012 discloses a method of rewriting firmware of an information processing device using a computer.

However, in such a conventional optical disc drive, since firmware is updated using a host PC or a network connected to the optical disc drive, it is impossible for only the optical disc drive to update the firmware automatically. Therefore, there is a problem that the firmware cannot be updated without other device such as a host PC or a network in the case where there is something wrong with the firmware before shipment, for example.

Further, in such conventional firmware updating methods for an optical disc drive, it is necessary to set up an environment of the computer or network connected to the optical disc drive and to operate utilities or the like of the host PC. Thus, there is also a problem that it takes so much time to carry out such operations.

SUMMARY OF THE INVENTION

It is an object of the present invention to provide an optical disc drive and a method of updating firmware of an optical disc drive, which can automatically carry out updating the firmware in a short time and easily with a small facility including an optical disc drive and a power supply without using a host PC or a network.

In order to achieve the object, in one aspect of the present invention, the present invention is directed to an optical disc drive for recording and/or reproducing data onto and/or from an optical disc when the optical disc is loaded into the optical disc drive. The optical disc drive of the present invention comprises:

an electrically rewritable flash ROM which stores firmware of the optical disc drive;

means for judging whether or not the loaded optical disc is a predetermined type of optical disc in which update data for updating the currently stored firmware is stored when the optical disc is loaded into the optical disc drive;

a buffer memory for temporarily storing the update data recorded in the loaded optical disc in the case where the judging means judges that the loaded optical disc is the predetermined type of optical disc; and control means for determining whether the currently stored firmware of the optical disc drive should be updated with the update data based on the absence or presence of a predetermined signal, and updating the currently stored firmware with the update data stored in the buffer memory in the case where it is determined that the currently stored firmware of the optical disc should be updated.

In the present invention, it is preferred that the optical disc drive further comprises an eject button wherein the predetermined signal is a signal outputted when the eject button is pushed.

In this case, it is preferred that the optical disc drive further comprises a timer measuring a predetermined time wherein the control means determines whether the currently stored firmware of the optical disc drive should be updated with the update data based on whether or not the signal from the eject button is detected within the predetermined time.

Further, it is preferred that the judging means sequentially judges whether the optical disc is a CD-R or not, whether the optical disc includes one session or not, whether additional data can be consecutively recorded in the optical disc or not, whether one variable packet-type track is included within the one session or not, and whether the data recorded in the track is the update data.

Furthermore, it is preferred that the optical disc drive of the present invention is constructed so as to be able to carry out the update of the firmware without connecting to a host computer or a network.

In another aspect of the present invention, the present invention is directed to a method of updating firmware currently stored in an electrically rewritable flash ROM of an optical disc drive. The method of the present invention comprises the steps of;

when the optical disc is loaded into the optical disc drive, judging whether or not the loaded optical disc is a predetermined type of optical disc in which update data for updating the currently stored firmware is recorded;

reading out the update data from the loaded optical disc and temporarily storing the update data in a buffer memory of the optical disc drive in the case where it is judged that the loaded optical disc is the predetermined type of optical disc;

determining whether or not the firmware currently stored in the flash ROM should be updated with the update data stored in the buffer memory based on the absence or presence of a predetermined signal; and updating the currently stored firmware of the optical disc drive with the update data stored in the buffer memory in the case where it is determined that the currently stored firmware should be updated.

In the present invention, it is preferred that the predetermined signal is a signal outputted when an eject button of the optical disc drive is pushed.

In this case, it is preferred that the method further comprises the step of:

measuring a predetermined time by a timer, wherein in the determining step it is determined whether the currently stored firmware of the optical disc drive should be updated with the update data based on whether or not the signal from the eject button is detected within the predetermined time.

Further, it is preferred that the optical disc having the predetermined format is a CD-R having one session in which one variable packet-type track is included, and additional data cannot be consecutively recorded in the optical disc.

The above described and other objects, structures and advantages of the present invention will be apparent when the following description of the preferred embodiment will proceed with reference to the appended drawings.

DETAILED DESCRIPTION OF THE PREFERRED EMBODIMENTS

The preferred embodiments of an optical disc drive and a method of updating firmware of an optical disc drive according to the present invention are described below with reference to FIGS. 1-4. Now, it should be noted that the embodiments (disclosure) are to be considered as an exemplification, and therefore this feature should not be intended to limit the present invention to the specific embodiments illustrated.

Figure 1:
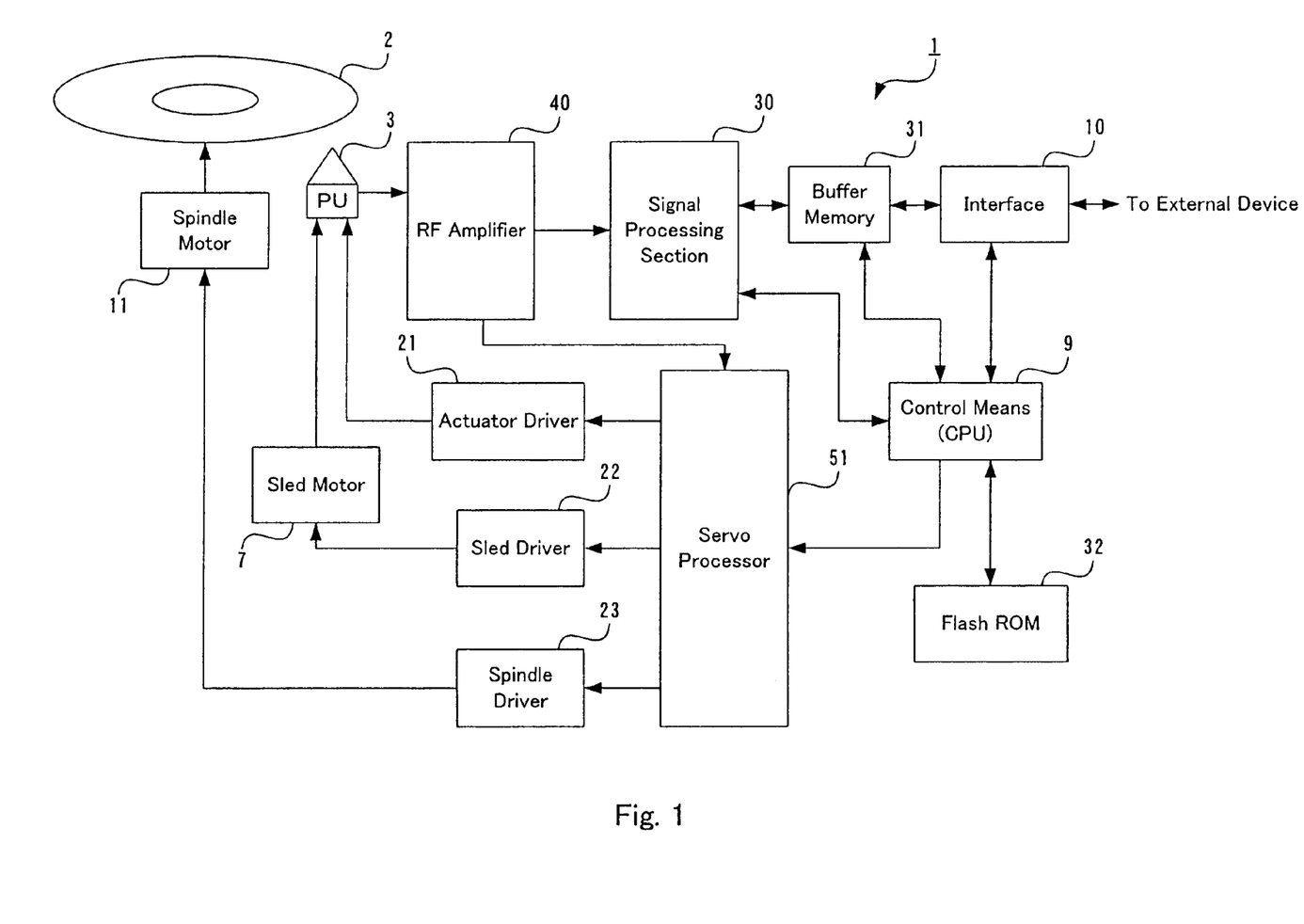
FIG. 1 is a schematic block diagram illustrating the main portion (circuit structure diagram) of the optical disc drive 1 of the present invention.
Figure 2:
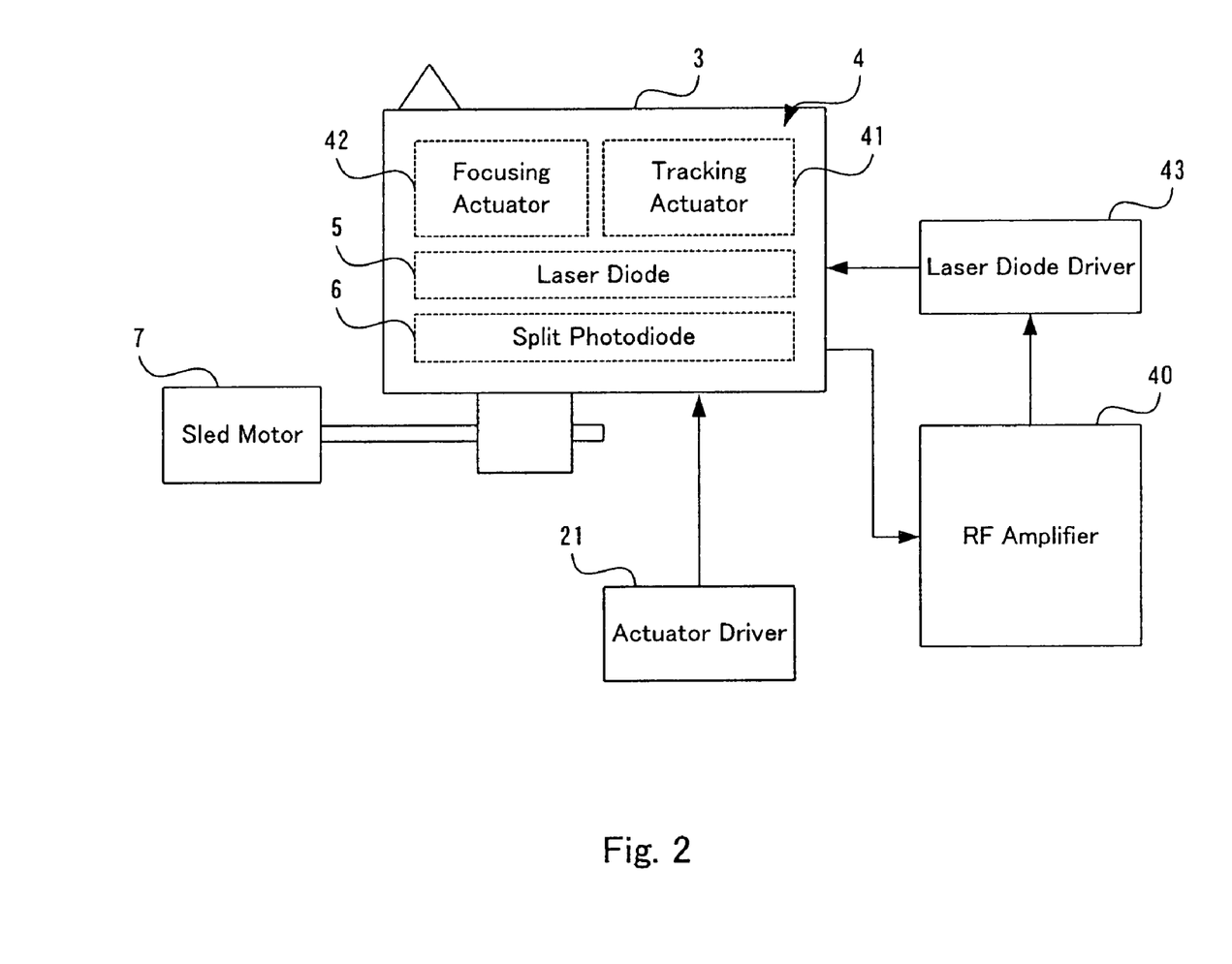
FIG. 2 is a diagram schematically illustrating an optical pick-up 3 and a part of elements related thereto.

First, a description will be given for the structure of an optical disc drive 1 of the present invention. FIG. 1 is a schematic block diagram illustrating the main portion (circuit structure diagram) of the optical disc drive 1 of the present invention. In FIG. 1, the optical disc drive 1 of the present invention is a disc drive that records and/or reproduces data onto and/or from an optical disc 2 such as a CD-ROM, a CD-R, a CD-RW or the like. Further, FIG. 2 is a diagram schematically illustrating an optical pick-up 3 and a part of elements related thereto. Hereinafter, the description will be given based on FIGS. 1 and 2. Here, even though it is not shown in the drawings, the optical disc drive 1 of the present invention is operated by an AC or DC power source supplied from the outside.

The optical disc drive 1 is equipped with a turntable (not shown in the drawings) on which the optical disc 2 is loaded, and a spindle motor 11 that rotates the turntable (i.e., the loaded optical disc 2) at a predetermined constant linear velocity. Further, the optical disc drive 1 is also equipped with a disc tray (not shown in the drawings) on which a media (optical disc) such as a CD-ROM, a CD-R, a CD-RW or the like is placed (loaded). The disc tray is moved (displaced) between a position for loading or ejecting the optical disc and a position for recording or reproducing information onto or from the optical disc.

Further, the optical disc drive 1 includes: an optical pick-up (optical head) 3 which is capable of moving in a radial direction of the loaded optical disc 2 (i.e., a radial direction of the turntable) to reproduce or record data from or onto the loaded optical disc 2; an optical pick-up base moving mechanism (not shown in the drawings) equipped with a sled motor 7 which moves an optical pick-up base of the optical pick-up 3 in the radial direction of the optical disc 2; an RF amplifier 40 which amplifies RF signals obtained by the optical pick-up 3 and then digitizes such RF signals to outputs digital data; a servo processor 51 which controls the driving (operation) of each drive portion of the spindle motor 11 and the like of the optical disc drive 1 based on the RF signals; a signal processing section 30 which demodulates (decodes) the sampling data (EFM signals), the sub-code data (digital data) and the like from the RF signals inputted from the RF amplifier 40; a buffer memory 31 which temporarily stores the sampling data (EFM signals) and the like demodulated by the signal processing section 30 and temporarily stores the data transferred from the host to be recorded onto the optical disc 2; control means (CPU) 9; a flash ROM 32 for storing optimized firmware and the like for the optical disc drive 1; an interface 10 which outputs the EFM signals and the like that were demodulated in the signal processing section 30 and temporarily stored in the buffer memory 31 to an external device (for example, host computer); an actuator driver 21 for driving actuators of the optical pick-up 3; a sled driver 22 for driving the sled motor 7; and a spindle driver 23 for driving the spindle motor 11; and a casing (not shown in the drawings) which houses all these elements. Furthermore, the optical disc drive 1 includes an eject button (not shown in the drawings) on the casing. When the eject button is pushed, a signal (push button signal) is outputted to the control means 9. A detailed description of each portion is given below.

The control means 9 is generally constituted from a microcomputer (CPU). The control means 9 controls the overall of the elements of the optical disc drive 1, including the optical pick-up 3 (including the actuator 4, a laser diode 5, and the like), the sled motor 7, the spindle motor 11, the RF amplifier 40, the signal processing section 30, the servo processor 51, the interface 10, the buffer memory 31, the flash ROM 32 and the like. Further, judging means (described later) in the present invention is mainly carried out by the control means 9.

In FIG. 2, the optical pick-up 3 includes an optical pick-up base equipped with a laser diode (light emitting portion) 5 and a split photodiode (light receiving portion) 6, and an objective lens (condenser) (not shown in the drawings) provided in the optical pick-up base.

The laser diode 5 is driven by a laser diode driver 43 controlled by the RF amplifier 40 and the control means 9 (not shown in FIG. 2), and emits a laser beam having a predetermined wavelength and any one of multiple power levels onto the optical disc 2. The split photodiode 6 includes one or more light receiving portions (not shown in the drawings) that receives the reflected light from the optical disc 2 of the light (laser beam) emitted from the laser diode 5. In the split photodiode 6, electric signals (reflected light-detection signals) of the voltage level corresponding to the amount of reflected light received by the light receiving portions are generated and outputted to the RF amplifier 40.

The objective lens is supported by suspension wires provided in the optical pick-up base, and is constructed so as to be capable of movement with respect to the optical pick-up base both in the radial direction of the optical disc 2 and in the rotational axis direction of the spindle motor 11 (i.e., a rotational axis direction of the turntable or an optical axis direction of the objective lens).

Further, the objective lens is arranged at a reference position (center point) for the objective lens which is predetermined on the optical pick-up base, namely, at a neutral position. When the objective lens is shifted from such reference position, the objective lens is biased toward the reference position by the restoring force of the suspension wires described above.

Further, as shown in FIG. 2, the optical pick-up 3 also includes the actuator 4 for moving the objective lens with respect to the optical pick-up base. The actuator 4 comprises a tracking actuator 41 for moving the objective lens in the radial direction of the optical disc 2, and a focusing actuator 42 for moving the objective lens with respect to the optical pick-up base in the rotational axis direction of the optical disc 2. The actuator 4, namely, the tracking actuator 41 and the focusing actuator 42 are constituted from a tracking coil and a focusing coil, which are driven by means of the actuator driver 21 by flowing electric current through the tracking coil and/or the focusing coil to interact with the magnetic fields of magnets (not shown in the drawings) provided near the coils.

When the objective lens follows tracks of the optical disc 2, it is possible to make the objective lens follow the tracks just by driving the tracking actuator 41 via the actuator driver 21 by control of the servo processor 51 within a range in which the objective lens can follow the tracks without moving the optical pick-up 3. On the other hand, in the case where the objective lens cannot follow the tracks without moving the optical pick-up 3, the servo processor 51 drives the sled motor 7 via the sled driver 22 to move the optical pick-up base in the same direction as the direction in which the objective lens was moved, thereby carrying out control so that the objective lens returns to the reference position. This control operation is referred to as sled control. In the movement control of the optical pick-up 3 in accordance with a seek command (a seek operation includes a rough search and a fine search), such sled control is carried out in the case where the rough search is conducted.

When the reflected light detection signals are supplied to the RF amplifier 40 from the split photodiode 6 of the optical pick-up 3, the RF amplifier 40 generates HF (RF) signals, tracking error (TE) signals, focusing error (FE) signals and the like based on such reflected light detection signals. In this regard, the RF signals are analog signals corresponding to pits and lands written on the optical disc 2, and the tracking error signals are signals indicating the size and direction of the shift of the objective lens in the radial direction from the center of the track (i.e., the amount of shift of the objective lens in the radial direction from the center of the track). Further, the focusing error signals are signals indicating the size and direction of the shift of the objective lens in the optical axis direction (rotational axis direction) from the focusing position (i.e., the amount of shift of the objective lens in the optical axis direction (rotation axis direction) from the focusing position).

Further, the RF amplifier 40 generates digitized signals by data-slicing the generated RF signals, and supplies these signals to the signal processing section 30 as data signals for reproducing. The RF amplifier 40 also supplies the generated tracking error signals and focusing error signals to the servo processor 51.

Based on the tracking error signals and the focusing error signals supplied from the RF amplifier 40, the servo processor 51 controls the driving of the actuator 4 and/or the sled motor 7 via the actuator driver 21 and/or the sled driver 22 to properly move the optical pick-up 3 in the radial direction and the optical axis direction of the optical disc 2.

Further, based on WOBBLE signals reproduced from the optical disc 2 or output signals from hall elements i.e., means for measuring a rotational speed of the spindle motor 11 (not shown in the drawings), which are disposed on the spindle motor 11, the servo processor 51 controls the driving of the spindle motor 11 via the spindle driver 23 to rotationally drive the optical disc 2 at a predetermined rotational speed.

In response to instructions from the control means 9, the signal processing section 30 demodulates (decodes) the reproduced signals supplied from the RF amplifier 40, and carries out predetermined signal processing. Then, the signal processing section 30 sequentially supplies the sampling data (EFM signals) and the like obtained by the signal processing such as demodulation and the like to the buffer memory 31, and then such data is supplied to the interface 10 via the buffer memory 31. The buffer memory 31 is constructed from a predetermined capacity RAM (Random Access Memory) or the like, and is a memory for temporarily storing the sampling data (EFM signals) demodulated in the signal processing section 30 and TOC information and the like read out from the lead-in region of the optical disc 2.

In response to instructions from the control means 9, the interface 10 transmits the sampling data (i.e., the data recorded on the optical disc 2) and the like supplied from the buffer memory 31 to an external device (for example, a host computer such as a personal computer (PC) or the like), and receives the commands executed by the optical disc drive 1, the data to be recorded on the optical disc 2 and the like from the external device. The interface 10 uses an existing interface standard such as ATAPI, SCSI or the like.

The flash ROM 32 is a kind of EEPROM (Electrically Erasable and Programmable Read Only Memory) for storing firmware and the like, and generally firmware and the like for carrying out basic control of the optical disc drive 1 are pre-stored in the flash ROM 32. In this invention, the firmware pre-stored in the flash ROM 32 (i.e., the currently stored firmware) is updated with new firmware in the case of predetermined conditions in firmware update process (described later).

Figure 3:
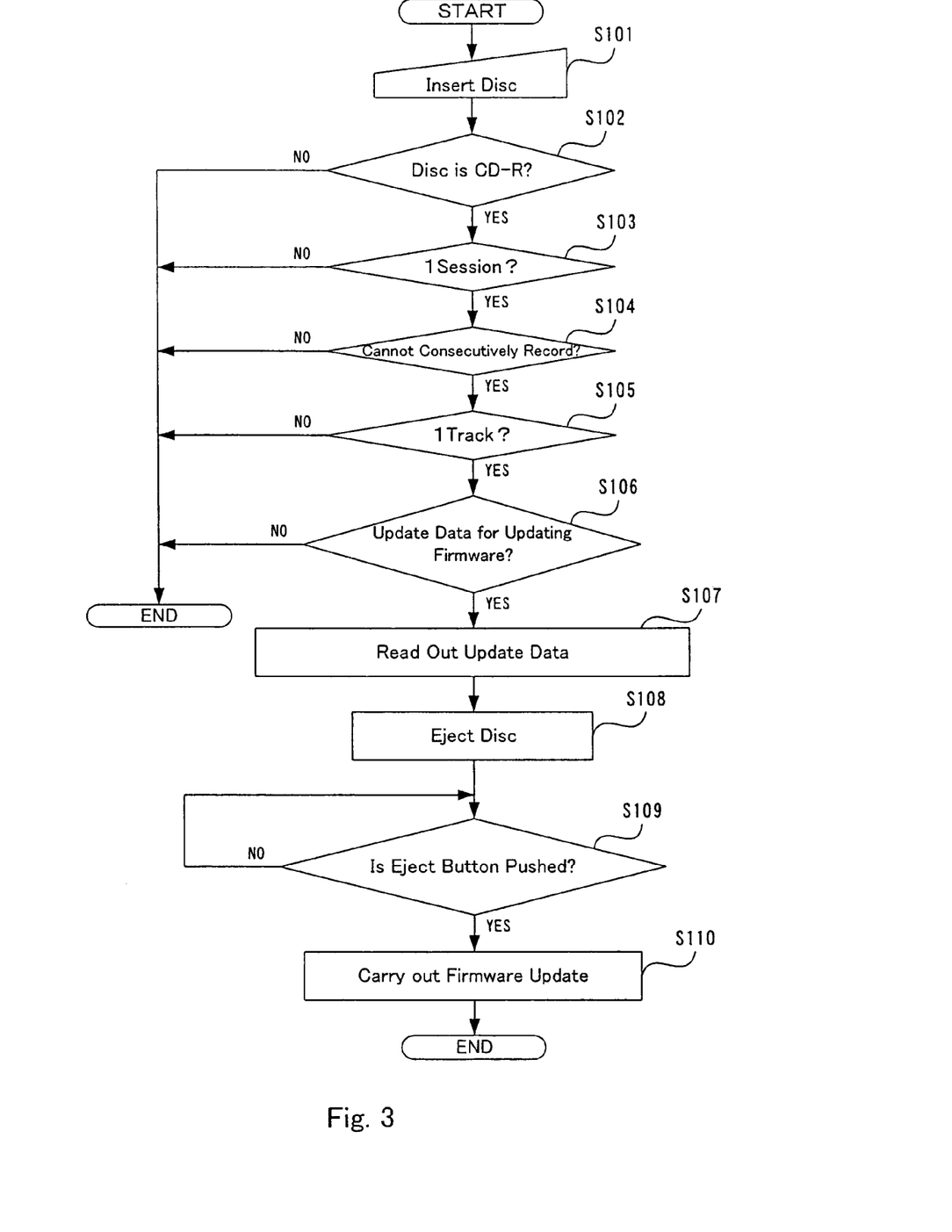
FIG. 3 is a flowchart illustrating a firmware update process in one embodiment according to the present invention.

Next, the operation of the optical disc drive in the preferred embodiment according to the present invention will be described with reference to the flowchart of FIG. 3. FIG. 3 is a flowchart illustrating firmware update process in one embodiment according to the present invention. This flowchart is described below using each of the elements shown in FIGS. 1 and 2 described above.

In this regard, a program for realizing each function described in this flowchart may be stored in a computer-readable ("optical disc drive-readable" in this embodiment) medium in the form of program codes (software). The medium is preferably CD-R in this invention. Alternatively, the program may be pre-stored in the flash ROM 32 or the like in the optical disc drive 1. The control means 9 sequentially carries out operations according to the program codes in the program.

The firmware update process of the present invention is carried out while alternating electric current is applied to the optical disc drive 1. First, a user (including an operator in a factory, hereinafter, such person is represented by the "user") loads a media (optical disc 2) such as a CD-R or the like on the tray of the optical disc drive 1, and insert the optical disc 2 into the optical disc drive 1 (Step S101).

Figure 4:
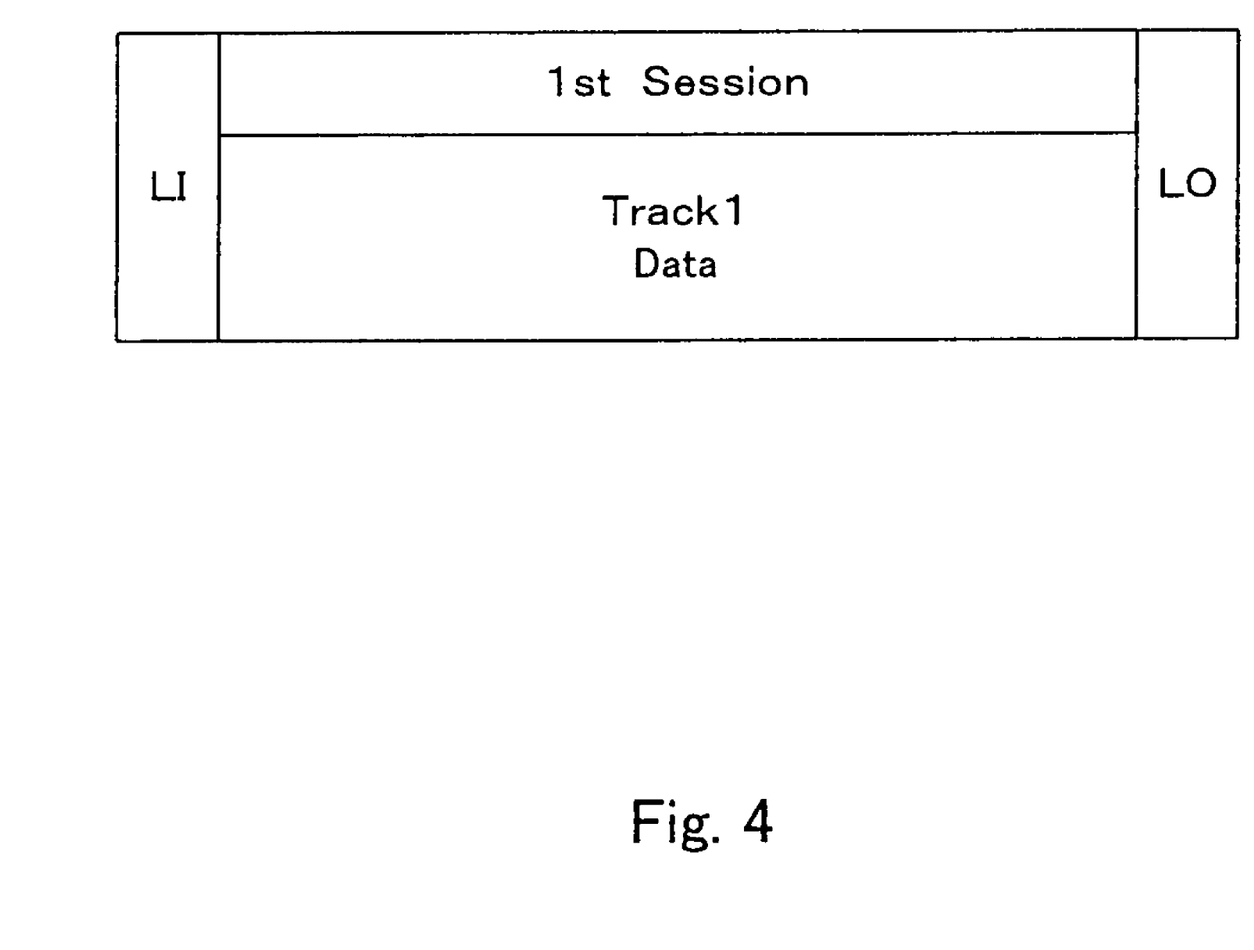
FIG. 4 is a diagram schematically illustrating a track structure of an optical disc 2 according to the present invention.

In this regard, a description will be given for the structure of a track of an optical disc 2 of the present invention with reference to FIG. 4. FIG. 4 is a diagram schematically illustrating the track structure of the optical disc 2 according to the present invention. In FIG. 4, the optical disc 2 has a lead-in region at an innermost periphery thereof, a lead-out region at an outermost periphery thereof, and a program area (data region) between these regions. TOC (Table Of Contents) information is recorded in the lead-in region. The TOC information includes track number recorded in this optical disc 2, start position for recording, total length of the data region, the type of disc, and the like. When a session is closed, the corresponding lead-in and lead-out regions are created. Further, it is recorded whether the optical disc 2 is multi-session type or single-session type in the lead-in region. When the session of the optical disc 2 is closed, additional data cannot be consecutively recorded in this optical disc 2. On the other hand, in the case where the session is not closed, additional data can be consecutively recorded in the optical disc 2, and next recording (writing) address is recorded in the lead-in region. The process after Step S102 of the firmware update method according to the present invention is carried out using the information.

The control means 9 determines whether the inserted (loaded) optical disc 2 is CD-R or not based on the TOC information recorded in the lead-in region of the optical disc 2 (Step S102). In the case where the loaded optical disc 2 is a type of an optical disc other than CD-R such as CD-ROM, CD-RW or the like, the control means 9 completes the firmware update process and stands by for other operations. This process at Step S102 corresponds to judgment process (judging means) of the type of optical disc.

On the other hand, in the case where the loaded optical disc 2 is a CD-R, based on the information recorded in the lead-in region of the CD-R, the control means 9 determines (judges) whether the optical disc 2 (i.e., CD-R) includes only one session or not, i.e., whether the disc 2 is not multi-session type optical disc having a plurality of lead-in and lead-out regions corresponding to the session number (Step S103). In the case where the CD-R is not one session type disc (namely, multi-session type disc), the control means 9 completes this firmware update process.

On the other hand, in the case where the CD-R is one session type disc, based on the information recorded in the lead-in region, the control means 9 then determines whether additional data can be consecutively recorded in the CD-R or not, i.e., whether the session of the CD-R is closed or not (Step S104). In the case where additional data can be consecutively recorded in the CD-R, the control means 9 completes this firmware update process.

In the case where additional data cannot be consecutively recorded in the CD-R, since it is confirmed that the loaded CD-R includes only one session at Step S103, the control means 9 determines whether track number in this session is one track or not based on the TOC information of the lead-in region (Step S105). In the case where there are a plurality of tracks in this session, the control means 9 completes this firmware update process. On the other hand, in the case where the track number is one, the program proceeds to Step S106. The process at Steps S103-S105 corresponds to the process for judging a physical format of the optical disc.

In this regard, in Orange Book that is standard of specification on Recordable CD, three types of systems for recording data in data track are defined. The CD-R that is used in the present invention one of the systems, i.e., Variable Packet system in which data is recorded in one track by dividing into variable-length packets.

At Step S106, the control means 9 finally determines whether the contents of the data recorded in the optical disc 2 is data for updating the firmware or not against the optical disc that meets conditions described above, namely, that has a predetermined type of optical disc and a predetermined type of physical format. More specifically, in the present embodiment, since same update data for updating the currently stored firmware is recorded in both logical addresses (two regions) 32-257 and 257-544 (not shown in FIG. 4), the control means 9 determines whether the update data for updating is recorded in either logical address or not. In this regard, recording same data in two regions is because it is considered that there is a case where the update data cannot be reproduced from either logical address.

Then, in the case where the optical disc 2 is not the optical disc for updating the firmware, i.e., the update data for updating the firmware is not recorded in the optical disc 2, the control means 9 completes this firmware update process. On the other hand, in the case where the optical disc 2 is the optical disc for updating the firmware, the control means 9 drives each motor via each driver to read out (reproduce) the update data for updating the firmware from either logical address described above via the optical pick-up 3, and to store such update data into the buffer memory 31 (Step S107). Then, the control means 9 makes the loaded optical disc 2 eject from the tray automatically (Step S108).

At Step S109, the control means 9 determines whether the eject button (not shown in the drawings) equipped on the front panel of the optical disc drive 1 is pushed by the user or not (this process corresponds to determining process). The user confirms that the tray loading the optical disc 2 for updating the firmware has been ejected from the optical disc drive 1, takes the optical disc 2 out from the tray (alternatively, maintains the optical disc 2 on the tray), and pushes the eject button. Thus, in the present invention, the optical disc drive 1 proceeds to next step of the firmware update process after it is confirmed that the optical disc 2 is loaded (or not loaded).

The control means 9 waits at this state until the eject button is pushed. In this way, in the present invention, since it is confirmed (determined) whether or not the currently stored firmware should be updated with the update data before the actual update of the firmware, the firmware update process can be stopped on the way in the case where the user inserts (loads) the optical disc 2 into the optical disc drive 1 by mistake.

In this case, the optical disc drive 1 may further comprises a timer or an oscillator for measuring a predetermined time. In the case where the control means 9 does not receive the push button signal from the eject button within the predetermined time, the optical disc drive 1 may be constructed so that the control means 9 erases the update data for updating the firmware stored in the buffer memory 31, and completes the firmware update process.

When the eject button is pushed, the control means 9 starts to update the currently stored firmware of the optical disc drive 1 with the update data for updating (Step S110). More specifically, the control means 9 drives a plurality of LEDs (not shown in the drawings) equipped on the front panel of the optical disc drive 1 to turn on an amber LED, and overwrites (or consecutively writes) the update data temporarily stored in the buffer memory 31 onto the firmware currently stored in the flash ROM 32. Further, in order to inform the user of the update status, the control means 9 turns on the amber LED to green light in the case where the update process is completed in an orderly manner. On the other hand, the control means 9 turns on the amber LED to red light in the case where the update process is completed in an abnormal manner. When the update process is completed in an abnormal manner, user may carry out same process again.

When the control means 9 finishes updating the firmware currently stored in the flash ROM 32 with the update data for updating the firmware temporarily stored in the buffer memory 31, the control means 9 completes the firmware update process, and stands by for other operations.

As described above, according to the optical disc drive 1 and the firmware update method in the preferred embodiments of the present invention, when an optical disc having a predetermined format (i.e., a predetermined type of optical disc) is loaded on the tray of the optical disc drive 1, it is judged the contents of the optical disc automatically. Then, in the case where update data for updating firmware is recorded in the optical disc, the currently stored firmware is updated with the update data by carrying out a predetermined confirming operation (a push button signal is detected, in the present embodiment).

Accordingly, the present invention makes it possible to automatically update firmware stored in an optical disc drive using only a predetermined type of optical disc and the optical disc drive without involving an external device such as a host PC or utilities thereof to transfer the update data.

Therefore, in the present invention, since this makes it possible to minimize the system (only power supply is required other than a predetermined type of optical disc and an optical disc drive), and it needs no time to start up or set up a host PC, it is possible to shorten and reduce the time and operations required for the firmware update process severely.

In particular, according to the optical disc drive and the firmware update method of the present invention, it is possible to update or alter the stored firmware easily by only applying the power to the optical disc drive without using a host PC in the case where any problem or trouble is found in the firmware for merchandises (optical disc drives) before shipment.

Further, in the present invention, since a CD-R is used as an optical disc 2 (media) for updating the currently stored firmware with update data for updating the firmware, such CD-Rs can be mass-produced. Thus, this makes it possible to carry out the firmware update process at low cost (inexpensively).

It should be noted that, in the embodiments described above, a CD-R is used as an optical disc (media) for recording update data of firmware, but the present invention is not limited to this media. In the present invention, any desired media having similar physical format and logical format may be used as such the media. It is also possible to apply the optical disc drive and the firmware update method of the present invention to other various optical disc drives for recording and/or reproducing data onto and/or from various types of optical discs such as DVD-RW, DVD-RAM and the like.

As described above, it should be noted that, even though the optical disc drive and the firmware update method of the present invention has been described with reference to the preferred embodiments shown in the drawings, the present invention is not limited to these embodiments, it is of course possible to make various modifications or deformations to each element of the optical disc drive, and various elements described above can be replaced with any other element capable of performing the same or a similar function.

What is claimed is:

1. An optical disc drive which can record and/or reproduce data onto and/or from an optical disc when the optical disc is loaded into the optical disc drive, the optical disc drive comprising:

an electrically rewritable flash ROM which stores firmware of the optical disc drive;

means for judging whether or not the loaded optical disc is a predetermined type of optical disc in which update data for updating the currently stored firmware is stored when the optical disc is loaded into the optical disc drive;

a buffer memory for temporarily storing the update data recorded in the loaded optical disc in the case where the judging means judges that the loaded optical disc is the predetermined type of optical disc;

control means for determining whether the currently stored firmware of the optical disc drive should he updated with the update data based on the absence or presence of a predetermined signal, and updating the currently stored firmware with the update data stored in the buffer memory in the case where it is determined that the currently stored firmware of the optical disc should be updated; and wherein the judging means sequentially judges whether the optical disc is a CD-R or not, whether the optical disc includes one session or not, whether additional data can be consecutively recorded in the optical disc or not, whether one variable packet-type track is included within the one session or not, and whether the data recorded in the track is the update data.

2. The optical disc drive according to claim 1, further comprising an eject button wherein the predetermined signal is a signal outputted when the eject button is pushed.

3. The optical disc drive according to claim 2, further comprising a timer measuring a predetermined time wherein the control means determines whether the currently stored firmware of the optical disc drive should be updated with the update data based on whether or not the signal from the eject button is detected within the predetermined time.

4. The optical disc drive according to claim 1, wherein the optical disc drive is constructed so as to be able to carry out the update of the firmware without connecting to a host computer or a network.

5. A method of updating firmware currently stored in an electrically rewritable flash ROM of an optical disc drive, the method comprising the steps of;

when the optical disc is loaded into the optical disc drive, judging whether or not the loaded optical disc is a predetermined type of optical disc in which update data for updating the currently stored firmware is recorded;

reading out the update data from the loaded optical disc and temporarily storing the update data in a buffer memory of the optical disc drive in the case where it is judged that the loaded optical disc is the predetermined type of optical disc;

determining whether or not the firmware currently stored in the flash ROM should be updated with the update data stored in the buffer memory based on the absence or presence of a predetermined signal;

updating the currently stored firmware of the optical disc drive with the update data stored in the buffer memory in the case where it is determined that the currently stored firmware should be updated; and wherein the optical disc having the predetermined format is a CD-R having one session in which one variable packet-type track is included, and additional data cannot be consecutively recorded in the optical disc.

6. The method according to claim 5, wherein the predetermined signal is a signal outputted when an eject button of the optical disc drive is pushed.

7. The method according to claim 6, further comprising the step of:

measuring a predetermined time by a timer, wherein in the determining step it is determined whether the currently stored firmware of the optical disc drive should be updated with the update data based on whether or not the signal from the eject button is detected within the predetermined time.

8. An optical disc drive which can record and/or reproduce data onto and/or from an optical disc when the optical disc is loaded into the optical disc drive, the optical disc drive comprising:

an electrically rewritable flash ROM which stores firmware of the optical disc drive;

means for judging whether or not the loaded optical disc is a predetermined type of optical disc in which update data for updating the currently stored firmware is stored when the optical disc is loaded into the optical disc drive;

a buffer memory for temporarily storing the update data recorded in the loaded optical disc in the case where the judging means judges that the loaded optical disc is the predetermined type of optical disc;

control means for determining whether the currently stored firmware of the optical disc drive should be updated with the update data based on the absence or presence of a predetermined signal, and updating the currently stored firmware with the update data stored in the buffer memory in the case where it is determined that the currently stored firmware of the optical disc should be updated;

further comprising an eject button wherein the predetermined signal is a signal outputted when the eject button is pushed, and further comprising a timer measuring a predetermined time wherein the control means determines whether the currently stored firmware of the optical disc drive should be updated with the update data based on whether or not the signal from the eject button is detected within the predetermined time.

9. The optical disc drive according to claim 8, wherein the judging means sequentially judges whether the optical disc is a CD-R or not, whether the optical disc includes one session or not, whether additional data can be consecutively recorded in the optical disc or not, whether one variable packet-type track is included within the one session or not, and whether the data recorded in the track is the update data.

10. The optical disc drive according to claim 8, wherein the optical disc drive is constructed so as to be able to carry out the update of the firmware without connecting to a host computer or a network.

11. A method of updating firmware currently stored in an electrically rewritable flash ROM of an optical disc drive, the method comprising the steps of;

when the optical disc is loaded into the optical disc drive, judging whether or not the loaded optical disc is a predetermined type of optical disc in which update data for updating the currently stored firmware is recorded;

reading out the update data from the loaded optical disc and temporarily storing the update data in a buffer memory of the optical disc drive in the case where it is judged that the loaded optical disc is the predetermined type of optical disc;

determining whether or not the firmware currently stored in the flash ROM should be updated with the update data stored in the buffer memory based on the absence or presence of a predetermined signal;

updating the currently stored firmware of the optical disc drive with the update data stored in the buffer memory in the case where it is determined that the currently stored firmware should be updated;

wherein the predetermined signal is a signal outputted when an eject button of the optical disc drive is pushed; and further comprising the step of:

measuring a predetermined time by a timer, wherein in the determining step it is determined whether the currently stored firmware of the optical disc drive should be updated with the update data based on whether or not the signal from the eject button is detected within the predetermined time.

12. The method according to claim 11, wherein the optical disc having the predetermined format is a CD-R having one session in which one variable packet-type track is included, and additional data cannot be consecutively recorded in the optical disc.

* * * * *